United States Patent
Keite-Telgenbüscher et al.

(10) Patent No.: US 8,911,642 B2
(45) Date of Patent: Dec. 16, 2014

(54) HEAT CONDUCTION COMPOSITION

(75) Inventors: Klaus Keite-Telgenbüscher, Hamburg (DE); Anja Staiger, Hamburg (DE); Florian Meyer, Hameln (DE)

(73) Assignee: tesa SE, Hamburg (DE)

( * ) Notice: Subject to any disclaimer, the term of this patent is extended or adjusted under 35 U.S.C. 154(b) by 164 days.

(21) Appl. No.: 12/995,583

(22) PCT Filed: Sep. 23, 2009

(86) PCT No.: PCT/EP2009/062305
§ 371 (c)(1), (2), (4) Date: Feb. 10, 2011

(87) PCT Pub. No.: WO2010/037674
PCT Pub. Date: Apr. 8, 2010

(65) Prior Publication Data
US 2011/0168376 A1 Jul. 14, 2011

(30) Foreign Application Priority Data

Oct. 1, 2008 (DE) .......................... 10 2008 049 849

(51) Int. Cl.
| | |
|---|---|
| *B32B 5/16* | (2006.01) |
| *C08K 3/20* | (2006.01) |
| *C08K 3/28* | (2006.01) |
| *C08K 3/38* | (2006.01) |
| *C08F 220/06* | (2006.01) |
| *C08F 220/10* | (2006.01) |
| *C09J 133/06* | (2006.01) |
| *C08K 3/22* | (2006.01) |

(52) U.S. Cl.
CPC .............. *C09J 133/06* (2013.01); *C08K 3/22* (2013.01); *C08K 3/38* (2013.01)
USPC .............. 252/74; 252/73; 428/323; 428/327; 428/329; 428/332; 524/399; 524/404; 524/394; 524/437

(58) Field of Classification Search
None
See application file for complete search history.

(56) References Cited

U.S. PATENT DOCUMENTS 6,096,414 A * 8/2000 Young ............................ 428/220
6,162,849 A * 12/2000 Zhuo et al. ..................... 524/404
(Continued)

FOREIGN PATENT DOCUMENTS

| EP | 0 566 093 A1 | 10/1993 |
| EP | 0 942 059 B1 | 9/1999 |

(Continued)

OTHER PUBLICATIONS

JP10060398A, Mar. 1998, English Ab.*
(Continued)

*Primary Examiner* — Satya Sastri
(74) *Attorney, Agent, or Firm* — Norris McLaughlin & Marcus, P.A.

(57) ABSTRACT

A heat conduction composition is proposed, comprising at least one polymer and a heat-conducting auxiliary material that has an especially high heat conductivity and at the same time has a high mechanical strength. To this end, the heat-conducting auxiliary material comprises particles that in turn are made up of primary particles and that have a mass-specific surface area of 1.3 m$^2$/g or less. Also described are a heat-conducting surface element manufactured from said heat conduction composition as well as application possibilities thereof.

13 Claims, 1 Drawing Sheet

(56) References Cited

U.S. PATENT DOCUMENTS

| | | | |
|---|---|---|---|
| 6,927,249 B1 * | 8/2005 | Lee et al. | 524/490 |
| 7,405,247 B2 * | 7/2008 | Sachdev et al. | 523/457 |
| 8,093,331 B2 * | 1/2012 | Fukui | 524/588 |

FOREIGN PATENT DOCUMENTS

| | | |
|---|---|---|
| EP | 0 942 060 B1 | 9/1999 |
| JP | 10060398 A * | 3/1998 |
| JP | 2004 168870 A | 6/2004 |
| JP | 2008 031358 A | 2/2008 |
| WO | 2004 056914 A | 7/2004 |

OTHER PUBLICATIONS http://en.wikipedia.org/wiki/Polycarbonate, May 2004.*
http://en.wikipedia.org/wiki/Boron_nitride, May 2004.*
http://accuratus.com/alumox.html, Dec. 2002.*

* cited by examiner

HEAT CONDUCTION COMPOSITION

This application is a 371 of PCT/EP2009/062305 filed Sep. 23, 2009, which claims foreign priority benefit under 35 U.S.C. §119 of the German Patent Application No. 10 2008 049 849.1 filed Oct. 1, 2008.

The invention relates to a thermal conduction composition comprising at least one polymer and a thermally conducting auxiliary, and to the use of this thermal conduction composition for producing a thermally conducting sheetlike element. The invention further relates to a thermally conducting sheetlike element with such a thermal conduction composition, and to the use thereof for heat transport within electronic devices.

In numerous areas of technology, controlled heat transfer has an important part to play. All of the fundamental problems in this context relate to the transport of thermal energy (heat) from a location of higher temperature (heat source) to a location of lower temperature (heat sink) as a result of a temperature difference (temperature gradient). One possibility for heat transfer is thermal conduction; additionally, heat transfer is also possible as part of a convective flow process or else in the form of thermal radiation.

Examples of typical heat sources include electronic assemblies whose operation produces heat, and also heating elements of any kind, and also vessels in which an exothermic chemical reaction takes place.

Typical heat sinks are cooler elements (such as, for example, passive cooling bodies, cooler/fan combinations, water coolers or Peltier elements) and also any body that is to be heated (for example, iced areas to be thawed, such as roof gutters and surfaces in the automating segment or in the aerospace travel industry).

One typical problem concerns the diversion of thermal energy which is produced, on the basis of the electrical resistance of components in an electronic circuit, in the form of what is called "Joule heat". Effective removal of the thermal energy is important particularly for semiconductor assemblies such as integrated circuits where overheating may result in the irreversible destruction of the assembly; frequently employed as heat sinks in this case are the abovementioned cooler elements which are in thermally conducting communication with the assembly (heat source). A thermally conducting connection of this kind is achieved by means of an intermediate layer which is disposed between the heat source and the heat sink and which enhances heat transfer between the heat source and the heat sink, thereby allowing a particularly large thermal flow to be diverted.

Intermediate layers used are generally thermally conductive pastes, which are applied to the surface of the assembly and of the cooler element. These thermally conductive pastes are composed largely of fluid matrix materials, such as of low molecular mass polymeric resins or waxes. To increase the thermal conductivity, thermally conducting auxiliaries are added in sufficiently large quantity to these matrix materials. Systems of this kind are usually highly deformable, in order to conform to the surface of the heat source and to the surface of the heat sink, and so to ensure extensive thermal contact with these elements. However, thermally conductive pastes are not capable of compensating mechanical forces that act on them, and so, in addition, a mechanical fixing of the heat sink on the heat source is required.

In order to be able to produce a mechanical connection between heat source and heat sink, in addition to the removal of heat, the use of thermally conducting adhesive systems has emerged as being particularly advantageous. These systems generally comprise mixtures of polymers with additives (known as "polymer compounds"), which are adapted in particular in respect of their thermal conduction properties. The polymer mixtures are typically provided in the form of a fluid adhesive system or pressure-sensitive adhesive system. By means of such polymer mixtures, moreover, it is particularly simple to realize electrical insulation between the heat source and the heat sink, which is an additional requirement for numerous applications—especially those in the electronics segment.

Fluid adhesive systems are known, for example, in the form of thermally conducting liquid adhesives or liquid pastes. Liquid adhesives are adhesives which initially are applied to the bond substrate in liquid form and which then cure in situ. For producing the thermally conducting liquid adhesives, conventional polymeric matrix systems which cure chemically (as a result of a crosslinking reaction, for instance) or physically are admixed with auxiliaries that have good thermal conduction.

Disadvantages of such thermally conducting liquid adhesives, however, are that they cannot be metered with sufficient accuracy and that, furthermore, during the joining of heat source with heat sink, they exhibit a flow behavior which cannot be controlled with sufficient precision. As a result of this, the resultant intermediate layers do not have a homogeneous thickness, and, moreover, excess material may emerge at the edges of the bond. A further disadvantage is that the fraction of the thermally conducting auxiliaries as a proportion of the thermally conducting liquid adhesive must be selected to be relatively high, in order to bring about sufficiently good thermal conductivity on the part of the intermediate layer, and this, in turn, greatly lessens the bond strength of the liquid adhesive.

Pressure-sensitive adhesive systems are known, for example, in the form of double-sidedly bondable sticky labels, in the form of an adhesive pad or adhesive tape, for instance. These systems feature a substantially two-dimensional disposition comprising at least one pressure-sensitive adhesive, and may be designed with a permanent carrier or else in carrier-free form.

As a polymeric matrix system of a pressure-sensitive adhesive system (i.e., as its high molecular mass constituents), EP 0 566 093 A1, EP 0 942 059 B1, and EP 0 942 060 B1 disclose, inter alia, pressure-sensitive adhesives which are based on esters of acrylic acid or methacrylic acid. Pressure-sensitive adhesives of this kind are notable for particularly high thermal stability and aging stability. In order to realize a high bond strength (more particularly a high shear strength), the pressure-sensitive adhesives contain comonomers having free acid groups, examples being acrylic acid or methacrylic acid.

In order to produce a thermally conducting mixture from a polymeric matrix system of this kind, the polymers of the pressure-sensitive adhesive system are blended (compounded) with the thermally conducting auxiliary, and then, where appropriate, are applied to the substrate or to a permanent or temporary carrier. Blending and applying may take place in principle in the melt, in solution or in dispersion.

In the case of blending in solution, the polymeric matrix system is dissolved wholly or at least partly in a suitable liquid medium (the solvent). The auxiliary is subsequently introduced with stirring into the resultant solution. Lastly, the solvent is removed from the mixture, which ought usually to be done completely as far as possible, in order to prevent formation of bubbles in the end product, as might otherwise occur during evaporation of the solvent. Similar to this is blending in dispersion, where the polymeric matrix system is not dissolved in the solvent as dispersion medium, but instead merely suspended.

For blending in the melt, the polymeric matrix system is first softened at elevated temperatures, the mixing temperature in this case being selected such that it is in the vicinity of, or is higher than, the softening temperature of at least part of the polymeric matrix system. Under such conditions, this part of the polymeric matrix system possesses a significantly lower viscosity than at room temperature, and so mechanical mixing with the added auxiliary is possible even without addition of solvents, in a compounder or an extruder, for instance.

Where pressure-sensitive adhesive systems are used, it is possible to obtain defined intermediate layers which, by virtue of their bond strength to the respective substrate, are able to transfer and divert mechanical forces that act on said substrate, without being damaged in the process. If, however, a particularly high thermal conductivity is to be realized, then, in the case of pressure-sensitive adhesive systems as well, this is achieved by selecting a high fraction of thermally conducting auxiliaries in the pressure-sensitive adhesive system, and this, in turn, results in a reduction in the bond strength and in the internal holding-together (cohesion) of the pressure-sensitive adhesive system.

This reduction in bond strength is even more problematic, however, when the pressure-sensitive adhesive system, as well as having good thermal conductivity, is to be electrically insulating. In this case, the auxiliaries with particularly good thermal conduction that comprise metals such as silver, gold, aluminum or copper, for instance, cannot be consistently used, and instead it is necessary to switch to nonmetallic thermally conducting materials. Nonmetallic materials, however, generally have a considerably lower thermal conductivity than metallic materials, and so, when using nonmetallic materials, the fraction of auxiliaries may have to be even greater if the intention overall is to achieve a level of thermal conductivity on the part of the pressure-sensitive adhesive system that is comparable with the thermal conductivity of metallic materials.

Nonmetallic thermally conducting auxiliaries employed include, in particular, aluminum oxide ($Al_2O_3$) and boron nitride (BN). The former in particular is preferred on account of its ready availability and on account of the favorable tradeoff between costs and attainable thermal conductivity. As typical nonmetallic auxiliaries it is also possible, for example, to use silicon dioxide ($SiO_2$), titanium(VI) boride ($TiB_2$), silicon nitride ($Si_3N_4$), titanium dioxide ($TiO_2$), magnesium oxide (MgO), nickel(II) oxide (NiO), copper(II) oxide (CuO), and iron(III) oxide ($Fe_2O_3$). Moreover, a large number of other nonmetallic materials are used as thermal conduction auxiliaries, examples being $ZrO_2$(MgO), $ZrO_2$ ($Y_2O_3$), aluminum titanate ($Al_2TiO_5$), aluminum nitride (AlN), boron carbide ($B_4C$), cordierite, reaction-bonded, silicon-infiltrated silicon carbide (SiSiC), non-pressure-sintered silicon carbide (SSiC), hot-pressed silicon carbide (HPSiC), hot-isostatically pressed silicon carbide (HIPSiC), reaction-bonded silicon nitride (RBSN), non-pressure-sintered silicon nitride (SSN), hot-pressed silicon nitride (HPSN) or hot-isostatically pressed silicon nitride (HIPSN).

It is an object of the present invention, therefore, to provide a thermal conduction composition which has good thermal conduction and at the same time is electrically insulating, and which eliminates these above-described disadvantages, offering more particularly a good and durable thermal contact with the surface of a heat source and/or heat sink.

This object is surprisingly achieved by a thermal conduction composition of the type specified at the outset, in which the thermally conducting auxiliary comprises particles which are composed of primary particles and which have a mass-based specific surface area of 1.3 $m^2$/g or less. Particularly for such particulate auxiliaries with specific surface areas of less than 1.3 $m^2$/g it has been observed that they result in a significantly higher thermal conductivity in the thermal conduction composition than do particulate auxiliaries composed of the same material but having a higher specific surface area.

This solution was unforeseeable for the skilled person, since normally the opposite effect would have been expected, namely an increase in the thermal conductivity of the composition in line with the specific surface area of the thermally conducting auxiliary, since a greater surface area ought to result in a greater heat transition surface, leading to the assumption of improved heat transition from the matrix polymer to the thermal conduction auxiliary.

Experiments on this point, however, have shown that a highly thermally conducting thermal conduction composition of this kind possesses a sufficiently high internal cohesion only when the individual auxiliary particles are additionally disposed as accumulations of individual primary particles and hence have an irregularly shaped surface which is not smooth. Only with a three-dimensional particle structure of this kind are these particles anchored so firmly, in structural terms, in the polymer matrix, that the resultant thermal conduction composition possesses, overall, a high cohesion, and also does not lose this cohesion at elevated temperatures under mechanical load.

In this context it has emerged as being advantageous in particular if the primary particles have an average diameter of at least 1 μm or even of more than 2 μm, since, in this way, thermal conduction compositions are obtained that have good thermal conduction and whose cohesion is in fact still high enough, at high temperatures, at which the viscosity of the polymer matrix goes down, to ensure a stable cohesion overall.

Particularly high thermal conductivities can be achieved for the thermal conduction composition if the particles of the thermally conducting auxiliary have an even lower mass-based specific surface area of not more than 1.0 $m^2$/g.

In one advantageous embodiment, the particles of the thermally conducting auxiliary are at least substantially aluminum oxide particles and/or boron nitride particles. As a result of the use of these inert auxiliaries, highly chemically stable thermal conduction compositions are obtained which, moreover, are advantageous from the standpoints both of economics and of the environment, since these materials are readily available, are not toxic, and, as compared with other possible auxiliaries, offer a good balance in terms of high thermal conductivity in conjunction with low costs.

Where the auxiliary comprises aluminum oxide, it has proven particularly useful for the aluminum oxide particles to be composed in a fraction of more than 95% by weight of alpha-aluminum oxide, more particularly in a fraction of 97% by weight or more. In this way it is possible to prevent premature crosslinking or gelling of polymer components based on acrylic acid or methacrylic acid or their esters within the thermal conduction composition, as may occur even in the mixing assembly, and results in a sharp increase in the viscosity. Where a high fraction of alpha-aluminum oxide is taken into account, the resultant mixtures also continue to have outstanding processing qualities. In contrast, for polymers based on esters of acrylic acid or methacrylic acid, it has been found that, if the fraction of gamma-aluminum oxide or beta-aluminum oxide reaches at least 5% by weight, gelling or crosslinking of the polymer occurs as early as the stage of introduction of the auxiliary into the melt, and so the resultant thermal conduction composition can no longer be shaped or applied as a homogeneous layer.

A thermal conduction composition is also particularly suitable when the material of the thermally conducting auxiliary has a thermal conductivity of more than 1 W/mK, more particularly of more than 10 W/mK, favorably of more than 25 W/mK, or even of more than 100 W/mK. In this way it is ensured that the thermal conduction composition permits a high level of heat transfer even at a low auxiliary content. The fraction of the thermally conducting auxiliaries as a proportion of the thermal conduction composition can therefore be kept low, thereby making it possible to produce highly cohesive thermal conduction compositions.

It is particularly useful in this case if the thermally conducting auxiliary is present in the thermal conduction composition in a fraction of at least 5% and not more than 70% by volume, more particularly at least 15% and not more than 50% by volume, based in each case on the volume of the thermally conducting auxiliary in the thermal conduction composition. In this way it is ensured that the thermal conduction composition overall permits rapid heat transport from the heat source to the heat sink. This is attributable on the one hand to the high thermal conductivity of thermal conduction compositions of this kind, but on the other hand also to a sufficiently high internal cohesion of the polymer matrix under these conditions, which, even under mechanical load, allows reliable thermal contact with the surfaces of the heat source and of the heat sink.

It is of advantage, furthermore, if the particles have an average diameter from a range from 2 µm to 500 µm, more particularly from a range from 2 µm to 200 µm, or even from a range from 40 µm to 150 µm. As a result of this design of the auxiliary, the thermal contact with the heat source and with the heat sink is in fact improved still further, since the particles, first, are small enough to conform exactly to the shape of the surface of the heat source and of the heat sink, but, second, are also large enough to achieve high thermal conductivity, without detriment overall to the internal cohesion of the thermal conduction composition.

With a view to improved possibilities for use of the thermal conduction composition, it is particularly useful for the thermal conduction composition to be designed as an adhesive, more particularly as an adhesive selected from the group encompassing pressure-sensitive adhesives, hot melt adhesives, and liquid adhesives. In this way it is possible to obviate additional fixing means which would otherwise be necessary in order to fix the heat sink relative to the heat source.

It has emerged as being advisable, furthermore, if the at least one polymer of the thermal conduction composition is a polymer based on acrylic esters, methacrylic esters and/or derivatives, and includes, in particular, comonomers containing acid groups. In this way it is possible to tailor the properties of the thermal conduction composition with particular simplicity and within a wide range, especially, for instance, its cohesive and/or adhesive properties. This is improved further by the capacity for the properties to be additionally tailored through the use of other suitable comonomers. Moreover, polymers of this kind offer the advantage that they can be blended in the melt with particular ease and then applied from the melt, thereby greatly simplifying further processing when using these systems.

It may further be useful if the thermal conduction composition further comprises a further auxiliary comprising a phase change material. With the aid of such phase change materials it is possible to realize thermal conduction compositions which are able to accommodate isolated thermal peaks, without this causing overheating in the thermal conduction composition and its surroundings—this enables uniform heat transport.

In accordance with a further aspect of the present invention, a thermally conducting sheetlike element is provided which comprises a thermal conduction composition with the above-described composition. With the aid of this thermally conducting sheetlike element, an interlayer can be introduced in a particularly simple way between a heat source and heat sink, the intermediate layer efficiently diverting the heat produced in the heat source and operating reliably in this context. Correspondingly, the present invention further provides for the use of the above thermal conduction composition for producing a thermally conducting sheetlike element, thereby making it possible in a particularly simple way to produce a thermally conducting sheetlike element which can be connected without problems to the surfaces of heat sources and heat sinks, where it affords a stable adhesive bond.

Finally, the use of the above thermal conduction composition is proposed for heat transport within electronic devices, as a result of which, owing to the high reliability of this thermal conduction composition and also the outstanding thermal contact achievable therewith between the heat source and the heat sink, damage to the components of the electronic device as a result of local overheating is efficiently counteracted.

A thermal conduction composition for the purposes of the present invention is any desired suitable composition comprising at least two different components and possessing a high thermal conductivity. The thermal conductivity of a substance is determined by the rate at which local heating of the substance propagates through the substance, and therefore corresponds to the capacity of the substance to transport thermal energy by means of thermal conduction, in the form of heat. The thermal conductivity is typically quantified as a temperature-dependent material constant, namely as (specific) thermal conductivity or coefficient of thermal conductivity, which is assigned the formula symbol $\lambda$ (lambda), l, k or $\kappa$ (Kappa) and the unit $W/(K \cdot m)$. A high thermal conductivity is considered more particularly to be a thermal conductivity higher than the thermal conductivity of the 60/40 water/ethylene glycol mixtures that are commonly used as heat-transfer media (thermal transport agents) in the energy industry, in other words which at 25° C. is greater than 0.44 W/mK.

Furthermore, the term "thermal conduction composition" implies that this composition, during use as a thermal conduction composition, has properties which are constant over time and is therefore inert under the specific application conditions (particularly in the temperature range of the application), so that no unintended chemical decomposition processes take place to any notable extent in the composition. However, this does not rule out the possibility, in a thermal conduction composition, of gradual, long-term breakdown of the composition as a result of usual service, of the kind that occurs with the known fluid heat transport systems as well. Furthermore, in a thermal conduction composition of the invention, there may also be a deliberate chemical change, such as an aftercrosslinking which is carried out to boost cohesion after the thermal conduction composition has been applied to the surface of the heat source or heat sink, or an intended phase transition within the thermal conduction composition for the purpose of obtaining latent heat storage.

In accordance with the invention the thermal conduction composition comprises at least one polymer and at least one thermally conducting auxiliary. Polymers which can be used are, without exception, all polymers that are suitable and are known to the skilled person, are chemically resistant in the particular field of application, and, in application, are dimensionally stable or at least substantially shape-retaining. These include not only low molecular mass waxes and resins but also high molecular mass polymer materials and engineering polymers. Examples among these include polymers based on natural rubbers, synthetic rubbers and/or silicones, especially polymers based on acrylates and/or methyacrylates.

"Based on" or "on the basis of" means in the present context that the properties of the polymer mixture are at least greatly determined by the fundamental properties of this polymer (known as the "base polymer"), although this, of course, does not rule out the additional influencing of these properties through the use of modifying auxiliaries or additives, or of further polymers, in the composition. In particular this may mean that the fraction of the base polymer as a proportion of the total mass of the polymeric phase is more than 50% by weight.

For the purposes of this invention, for instance, polymers based on acrylic acid and/or methacrylic acid can be used, examples being those based on acrylic esters, methacrylic esters and/or derivatives thereof, since these compounds have particular aging stability and are therefore able to withstand repeated heat transport processes over a long time. Having emerged as advantageous in particular in this context are polymers which further comprise comonomers with acid groups.

Particularly suitable are acrylate-based polymers which are obtainable, for instance, by radical polymerization and which are based at least partly on at least one acrylic monomer of the general formula $CH_2=C(R^1)(COOR^2)$, where $R^1$ is H or a $CH_3$ radical and $R^2$ is selected from the group of saturated, unbranched or branched, substituted or unsubstituted $C_1$ to $C_{30}$ alkyl radicals (advantageously the $C_2$ to $C_{20}$ alkyl radicals, the $C_4$ to $C_{14}$ alkyl radicals or even the $C_4$ to $C_9$ alkyl radicals), but may optionally also represent H.

Specific examples, without wishing to be restricted by this recitation, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl metharylate, n-nonyl acrylate, lauryl acrylate, stearyl acrylate, behenyl acrylate and their branched isomers, examples being isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate, and 3,5-dimethyladamantyl acrylate.

In addition to the at least one type of acrylic monomer, these polymers may include further comonomers, which advantageously are polymerizable with the at least one acrylic monomer, as for instance vinyl compounds having functional groups, maleic anhydride, styrene, styrenic compounds, vinyl acetate, acrylamides, double-bond-functionalized photo-initiators, and the like.

In accordance with the invention, the at least one polymer serves as a matrix for the thermally conducting auxiliary. An auxiliary (adjuvant, additive) is understood in principle to be any substance which is added to the polymer constituents (the polymeric phase, polymer matrix) of the thermal conduction composition in order to exert a deliberate influence over the properties and functionality of the thermal conduction composition.

A thermally conducting auxiliary in the sense of the invention is any auxiliary which itself has a high thermal conductivity and, when incorporated into the polymer matrix, increases the thermal conductivity of the thermal conduction composition overall. In particular it is of advantage here if the material of the thermally conducting auxiliary has a thermal conductivity of more than 1 W/mk, more particularly of more than 10 W/mk, or even of more than 25 W/mk. The volume fraction of the thermally conducting auxiliary in the thermal conduction composition may advantageously here be at least 5% and not more than 70% by volume, more particularly at least 15% and not more than 50% by volume. Since the thermally conducting auxiliary may be porous, the volume fraction of the thermally conducting auxiliary is understood to be the volume increase in the thermal conduction composition that occurs when the thermally conducting auxiliary is added to the thermal conduction composition, based on the respective final volume of the thermal conduction composition following the addition (the volume fraction is therefore based on the volume of the thermally conducting auxiliary in the form in which it is present in the thermal conduction composition). The volume fraction can be converted into the corresponding mass fractions of the formulation, taking into account the compact density of the thermally conducting auxiliary (i.e. not its bulk density) and the density of the polymer.

Thermally conducting auxiliaries which can be used are, in principle, all suitable materials which are miscible with the polymer. Use is made in particular, in accordance with the invention, of ceramic materials, in other words of materials which are composed of inorganic and predominantly nonmetallic compounds and/or elements and which are present to an extent of more than 30% by volume in crystalline form, examples being silicates, oxides, carbides, nitrides, silicides, borides, and the like.

As thermally conducting auxiliary it is possible, for instance, to use aluminum oxide ($Al_2O_3$), boron nitride (BN), silicon dioxide ($SiO_2$), titanium(VI) boride ($TiB_2$), silicon nitride ($Si_3N_4$), titanium dioxide ($TiO_2$), magnesium oxide (MgO), nickel(II) oxide (NiO), copper(II) oxide (CuO), and iron(III) oxide ($Fe_2O_3$), and also other nonmetallic materials, examples being $ZrO_2$(MgO). $ZrO_2$ ($Y_2O_3$), aluminum titanate ($Al_2TiO_5$), aluminum nitride (AlN), boron carbide ($B_4C$), cordierite, reaction-bonded, silicon-infiltrated silicon carbide (SiSiC), non-pressure-sintered silicon carbide (SSiC), hot-pressed silicon carbide (HPSiC), hot-isostatically pressed silicon carbide (HIPSiC), reaction-bonded silicon nitride (RBSN), non-pressure-sintered silicon nitride (SSN), hot-pressed silicon nitride (HPSN) or hot-isostatically pressed silicon nitride (HIPSN).

In accordance with the present invention, the thermally conducting auxiliary is in the form of particles. Particles are considered presently to comprehend any accumulation of material that is composed of individual volume bodies delimited from one another and with external dimensions that are very small—in other words, for example, powders, dusts, including fine dusts, colloids, including sols, aerosols, and the like. The definition of a particle does not depend fundamentally on the particle having a particular internal structure, a particular crystallinity, a particular form factor or a particular—regular or irregular—external shape.

Among the particulate thermally conducting auxiliaries, those which have emerged as being particularly useful are those which consist at least in part of aluminum oxide particles and/or boron nitride particles, in other words of particles of any desired aluminum oxide or any desired boron nitride.

For the aluminum oxide particles it is useful, from the standpoint of better processing properties especially when using acrylate-based polymers, if these particles are composed in a fraction of more than 95% by weight, or even of at least 97% by weight, of alpha-aluminum oxide (rhombohedral or trigonal aluminum oxide; in the form of corundum, for instance) and have only a very small fraction of other modifications, for example cubic gamma-aluminum oxide or else the merely so-called "beta-aluminum oxide" ($Na_2O*11Al_2O_3$).

With a view to confining the external dimensions of these particles, it may be useful if only those particles are employed that have an average diameter from a range from 2 µm to 500 µm, more particularly from a range from 2 µm to 200 µm, or even from a range from 40 µm to 150 µm. Average diameter means a particle diameter averaged via a particle size distribution, as a mass average or number average, and this particle diameter may also be identical with the single particle size in the case where there is only one single particle size (i.e., a monodisperse substance). Instead of this, the average particle diameter may also be defined as the D50 value, in other words as that particle diameter above which and below which in each case 50% by weight of the particles within the size distribution are located. The particle diameter used here is the average diameter averaged via a particle, which in the case of irregularly shaped particles lies between the maximum diameter and the minimum diameter of the particles.

Particle sizes and their distributions can be determined using all of the methods that are customary for the purpose, as for instance by means of image analysis of microscopic images (for example, images obtained from optical microscopy, including ultramicroscopy, from electron microscopy or from scanning force microscopy), from the diffraction or scattering of electromagnetic radiation (for instance, laser diffraction or scattering, or X-ray diffraction/scattering, including small-angle scattering), from sedimentation measurements, as for instance by means of an ultracentrifuge, and the like.

For the present invention to be realized it is necessary for the particles to have a mass-based specific surface area of 1.3 $m^2/g$ or less, preferably even of less than 1.0 $m^2/g$. The specific surface area of the particles is the entirety of all of the surfaces that are present within the sample volume, including not merely the outer boundary of the particles (external surface area or geometric surface area, which is therefore visible from the outside), but likewise the surface area within the particles, as for instance the boundary surfaces within individual cavities, channels, pores, and the like. Designated in the present case is the mass-based specific surface area of the particles, in other words the surface area present in a sample amount of a mass of 1 g. Typically, such specific surface areas are determined by means of the sorption method (BET determination), in which the adsorption and desorption of a probe gas (generally nitrogen, helium or mercury) on the available surface of the sample are investigated. Thus, when using boron nitride, an acceptable thermal conductivity has been observed for a specific surface area of just 5 $m^2/g$, and a further reduction in the specific surface area to values of below 1.3 $m^2/g$ results in an additional drastic increase in the thermal conductivity.

Furthermore, it is necessary for the purposes of the invention for the thermally conducting particles to be in turn composed of primary particles. A primary particle is a particle of very small diameter which, for example, is almost wholly crystalline (crystallite) or amorphous, and of which, in turn, larger structures are composed, in the present case the particles. These particles may be amorphous or polycrystalline (for instance, when the primary particles as individual crystal domains have a different spatial orientation) or else may possess a superordinate crystal structure, provided the particles overall are not compact.

The particles composed of primary particles are present in the form of any desired three-dimensional accumulation of a large number of smaller individuals that are crowded closely to one another and joined externally—in the form, for example, of a nonfused assembly of primary particles adjoining one another at edges and angles, and with a total surface area virtually identical to the sum of the individual surface areas, or as a fused assembly of primary particles adjoining flatly with one another via side-face regions, with a surface area smaller than the sum of the surface areas of the primary particles—in the form, for instance, therefore, of agglomerates, aggregates, associations, coacervates, flocculates, conglomerates, and the like.

These primary particles may inventively have average diameters of at least 1 µm, more particularly of at least 2 µm. Corresponding to the particle diameter, the average diameter is understood to be a primary particle diameter averaged via a primary particle size distribution, as mass average or number average. The primary particle diameter is the average diameter, averaged over individual primary particles, which in the case of irregularly shaped primary particles, for instance, lies between the maximum diameter and the minimum diameter of the primary particles.

As a result of the construction of the particles from primary particles, therefore, the external surface of the particles is not smooth but is instead irregular, having a multiplicity of individual elevations and depressions. If the three-dimensional structure of these particles is to be described in the context of fractal geometry, this might be done, for instance, by using a fractal dimension which in each case is greater than two and also less than three. Three-dimensional structures with such folding are not present in the case of a particle having a regular geometrical (nonfractal) surface, as in the case, for instance, of a tetrahedron, a cone, a sphere, a rotational ellipsoid, a cuboid or a prism.

Furthermore, primary particles of the size described above ensure that the cavity structures (pores) between the primary particles that form when the primary particles adjoin with one another are sufficiently large that the polymer matrix may penetrate at least partly into the particles, by filling part of the space between two adjacent primary particles. Complete coverage of the surface area present within particles, however, even under these conditions, is unlikely, since with small pore diameters in particular the capillary pressure within these pores may be very high, and so within the particles there may also be sections of the particle surface area that are not covered by the polymer composition and are therefore exposed.

As a result of the above-described structure, the thermal conduction composition acquires not merely a high mechanical robustness, but instead at the same time a high thermal conductivity is ensured.

For the materials described above, it is possible to obtain particles that can be used in accordance with the invention, by various methods, as for instance in wet-chemical precipitation reactions, as calcined or pyrogenic metal oxide or Aerosil, and also by mechanical comminution of macroscopic material composed of primary particles, in a ball mill, for instance.

The thermal conduction composition may further be adapted through the specific choice of its components in order to have an adhesive behavior corresponding to that of an adhesive, for instance an adhesive selected from the group encompassing pressure-sensitive adhesives, hot melt adhesives, and liquid adhesives. This can be achieved, for example, by using adhesive polymers which at the same time produce a mechanical force transfer between the two bond substrates (heat source and heat sink).

Pressure-sensitive adhesives (PSAs) are those adhesives which permit permanent bonding to the substrate at room temperature under just a relatively weak applied pressure. In contrast, hot melts (or hot melt adhesives) is the term used for those adhesives which enter into a permanent bond with the substrate only at elevated temperatures, the resultant bond being retained even on subsequent cooling to room temperature. The bondability both of PSAs and of hotmelts derives from the adhesive properties, among others, of the respective adhesives.

Adhesion typically refers to the physical effect brought about by the holding-together of two phases, brought into contact with one another, at their interface on account of intermolecular interactions that occur there. Adhesion therefore defines the attachment of the adhesive to the substrate surface and can be determined as tack or as bond strength. In order to influence the adhesion of an adhesive in a specific way, it is common to add plasticizers and/or bond-strength enhancer resins (known as "tackifiers") to the adhesive.

Cohesion typically refers to the physical effect which results in the internal holding-together of a substance or composition on account of intermolecular and/or intramolecular interactions. The forces of cohesion therefore determine the consistency and fluidity of the adhesive, which can be determined, for instance, as viscosity and as shear resistance time. In order to increase the cohesion of an adhesive in a specific way, it is often subjected to additional crosslinking, for which reactive (and hence crosslinkable) constituents or other chemical crosslinkers are added to the adhesive and/or the adhesive is subjected to actinic (high-energy) radiation, as for example ultraviolet light or electron beams, in an aftertreatment.

The technical properties of a PSA are determined primarily by the relationship between adhesional and cohesional properties. For certain applications, for example, it is important that the adhesives used are highly cohesive, i.e., possess a particularly strong internal holding-together, whereas for other applications a particularly high adhesion is required. PSAs and hotmelts may additionally be equipped with chemical or physical curing or crosslinking mechanisms.

In the case of liquid adhesives (for example, solvent borne wet adhesives or water-based dispersion adhesives) a low-viscosity solution or dispersion of the polymer phase is applied to the bond substrates. In the course of the evaporation of the solvent (organic solvents or water), the viscosity of the solution or dispersion increases, and so the bond substrates are joined to one another by the resultant polymer film. Liquid adhesives include, for instance, 1-component or multicomponent, chemically or physically setting adhesives.

A thermal conduction composition may of course, furthermore, also include other formulating constituents and/or adjuvants such as, for example, auxiliaries, pigments, rheological additives, adhesion promoter additives, plasticizers, resins, elastomers, aging inhibitors (antioxidants), light stabilizers, UV absorbers, and also other auxiliaries and additives, examples being driers (for instance molecular sieve zeolites or calcium oxide), flow and flow-control agents, wetting agents such as surfactants or catalysts, thermally conducting fillers, and also heat-storing fillers.

Auxiliaries used may be all finely ground, solid adjuvants, examples being chalk, magnesium carbonate, zinc carbonate, kaolin, barium sulfate, titanium dioxide or calcium oxide. Other examples are talc, mica, silica, silicates or zinc oxide. Of course, mixtures of the substances stated may also be used.

The pigments used may be organic or inorganic in nature. All kinds of organic or inorganic color pigments are contemplated, examples being white pigments such as titanium dioxide (for improving the light stability and UV stability) or metal pigments. Where metal pigments or other metallic auxiliaries or carrier materials are used, it should of course be ensured that these metallic constituents, when employed in a thermally conducting sheetlike element that is electrically insulating overall and has a high electrical breakdown resistance, must not be present comprehensively throughout the thickness of the sheetlike element; instead, the sheetlike element, at least in one laminar subregion, must be completely electrically insulating.

Examples of rheological additives are fumed silicas, phyllosilicates (bentonites, for example), high molecular mass polyamide powders, or powders based on castor oil derivatives.

Adhesion promoter additives may be, for example, substances from the groups of the polyamides, epoxides or silanes. The improvement in adhesion that can be achieved using such promoters relates not only to the adhesion of the PSA to a bond substrate or carrier, but also to the internal adhesion of the polymer matrix to the thermally conducting auxiliary particles.

Examples of plasticizers for improving the adhesiveness are phthalic esters, trimellitic esters, phosphoric esters, adipic esters, and esters of other acyclic dicarboxylic acids, fatty acid esters, hydroxycarboxylic esters, alkylsulfonic esters of phenol, aliphatic, cycloaliphatic, and aromatic mineral oils, hydrocarbons, liquid or semisolid rubbers (for example, nitrile rubbers or polyisoprene rubbers), liquid or semisolid polymers of butene and/or isobutene, acrylic esters, polyvinyl ethers, liquid resins and plasticizing resins based on the raw materials which also constitute the basis for tackifying resins, lanolin and other waxes, silicones, and also polymer plasticizers such as polyesters or polyurethanes, for instance.

Formulating the thermal conduction composition with the further constituents, such as auxiliaries and plasticizers, for example, is likewise prior art.

In order to optimize the technical properties, the thermal conduction compositions of the invention may be admixed with resins. Tackifying resins (bond strength enhancer resins) for addition that can be used include, without exception, all existing tackifier resins described in the literature. Representatives that may be mentioned include the pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$ to $C_9$ and other hydrocarbon resins. Any desired combinations of these and additional resins may be used in order to bring the properties of the resultant thermal conduction composition into line with requirements. Generally speaking, it is possible to use all resins that are compatible (soluble) with the corresponding base polymer; reference may be made in particular to all aliphatic, aromatic, and alkylaromatic hydrocarbon resins, hydrocarbon resins based on pure monomers, hydrogenated hydrocarbon resins, functional hydrocarbon resins, and natural resins.

A further advantageous embodiment of the sheetlike element may be achieved by adding a heat-storing filler to at least one of the layers. A heat-storing filler in the present context means any filler having a high heat capacity, more particularly having a heat capacity of more than 0.7 J/gK. As a result of the thermal buffer effect of such substances, uniform heat transport can be obtained in this way. Fillers with high heat capacity that can be used advantageously are, for instance, aluminum, boron, calcium, iron, graphite, copper, magnesium or compounds of the aforementioned substances, especially aluminum chloride, calcium carbonate, calcium chloride, copper sulfate, magnetite, hematite, magnesium carbonate, and magnesium chloride.

As heat-storing filler it is preferred to use a phase-transition or "phase change" material. With the aid of these materials it is possible to buffer short-term peaks in the thermal flux. Latent heat stores of this kind that can be used include all of the phase change materials that are known to the skilled person, examples being low-melting salts or paraffin waxes.

The thermal conduction compositions of the invention can be used with outstanding effect for producing a thermally conducting sheetlike element. Sheetlike elements for the purposes of this specification are, in particular, all customary and suitable structures having a substantially two-dimensional extent. These structures may take various forms, being flexible in particular, as a sheet, tape, label or shaped diecut.

The sheetlike elements thus obtained may be of any desired type—that is, they may, for instance, have a permanent carrier or else may be of carrier-free design. It has emerged as being particularly advantageous if the sheetlike element is adhesive, in other words if, for instance, an adhesive polymer compound is used as thermal conduction composition. Where, for example, a thermal conduction composition having pressure-sensitive adhesive properties is used, then the metering of the thermal conduction composition and the joining of a heat source to a heat sink become particularly simple overall.

The thermal conduction composition of the invention can be prepared using, without exception, all known and suitable methods. Thus, for example, the at least one polymer may be mixed with the filler or fillers in a typical mixing assembly, as a solid or in the melt, in a compounder or twin-screw extruder, for instance.

The sheetlike elements of the invention as well can be produced using, without exception, all known and suitable methods. Hence sheetlike arrangements of the thermal conduction compositions of the sheetlike element of the invention can be produced with the familiar techniques for producing polymeric sheetlike elements in accordance with the prior art. These include, for instance, flat-film extrusion, blown-film extrusion, the calender process, and coating from the melt, from a solution, from a dispersion, or from a monomeric or prepolymeric precursor of the polymer.

To produce the sheetlike elements it is possible, for example, for the thermal conduction composition first to be spread out in the form of a layer, as for instance on a permanent carrier or on a temporary manufacturing carrier (referred to as an "in-process liner"), which is separated from the sheetlike element again during the process or no longer than at the end of the process. Where a permanent carrier is used, it is advantageous for it to possess a high thermal conductivity, by virtue, for instance, of likewise comprising thermally conducting fillers. Alternatively or additionally, the sheetlike element may also comprise, as a thermally conducting carrier by means of which rapid heat transport is realized over the entire area of the sheetlike element, a sheetlike metallic structure, such as a film, a lattice, a nonwoven web, a woven fabric or an expanded metal, for example. Sheetlike elements of this kind are used in accordance with the invention to join heat sources and heat sinks, especially within electronic devices.

BRIEF DESCRIPTION OF THE DRAWINGS

Further advantages and possibilities for application will be apparent from the exemplary embodiments, which are to be described in more detail below with reference to the attached diagrams of measurement values. Here.

The properties of the heat conduction compositions produced on an exemplary basis were investigated using the following techniques:

For determining the specific surface area of different thermally conducting auxiliaries, a variant of the BET method was carried out, within which the adsorption of nitrogen on an arbitrary sample was determined in accordance with DIN 66132 (single-point difference method according to Haul and Dümbgen), on ceramic powders in accordance with ISO 18757:2003 (German version: EN ISO 18757:2005) and/or on aluminum oxide in accordance with ISO 8008.

To determine the average particle size of the thermally conducting auxiliaries, a static laser light diffraction was performed on samples dispersed in water by means of ultrasound (instrument: Malvern Instruments Mastersizer 2000), evaluation taking place according to the Fraunhofer model.

To determine the thermal conductivity of the thermal conduction compositions with the thermally conducting auxiliaries, a method in accordance with ISO draft 22007-2 was carried out (specimen thickness: 10 mm on both sides of the sheetlike heating element).

The determination of the electrical breakdown resistance of pressure-sensitive adhesive sheetlike elements obtained with the thermal conduction compositions took place in accordance with VDE 0100.

The determination of the bond strength of pressure-sensitively adhesive sheetlike elements with thermal conduction compositions of 200 μm mass thickness took place in a peel test under an angle of 90° with a peeling speed of 300 mm/min in accordance with PSTC 1 (corresponding to ASTM D 3330-04/ISO 29862:2007). All measurements were carried out at room temperature (23° C.) under standardized conditions (at 50% relative humidity). The peel test was carried out as a representative example on a single sample, the determination of the bond strength taking place after a bonding time/aging duration of two weeks.

The thermal conduction compositions were prepared from an acrylate polymer composition and thermally conducting auxiliaries. The pressure-sensitive adhesive (PSA) used was a PSA with an acrylate polymer composition comprising as comonomers 45% by weight ethylhexyl acrylate, 45% by weight butyl acrylate, 8% by weight methyl acrylate, 1% by weight hydroxyethyl methacrylate, and 1% by weight acrylic acid.

Thermally conducting auxiliaries used were various aluminum oxide powders from different manufacturers, in order to ensure that the measurement results are independent of the particular method by which the particles are produced.

For preparing the acrylate polymer composition, the individual comonomers were polymerized in a mixture of benzine and acetone, in a way which is known to the skilled person. The solvent was then removed by means of a degassing extruder from the resultant acrylate polymer composition.

To produce a thermal conduction composition, the acrylate polymer composition obtained above was melted and the respective thermally conducting auxiliary was incorporated into the melt in a laboratory compounder from the company Haake, at a temperature of 100° C. The volume of the thermally conducting auxiliary was selected in each case such that 40% by volume of the blended thermal conduction composition could be accounted for by the thermally conducting auxiliary.

For producing the thermally conducting, pressure-sensitively adhesive sheetlike elements, the thermal conduction composition obtained above was pressed in a vacuum press at a temperature of 150° C. to give films with a thickness of 200 µm. In order to realize the 10 mm sample thickness needed for the measurement of the thermal conductivity, 50 of these carrierless sheetlike elements were laminated with one another.

In order to illustrate the effect which can be achieved by using the inventive thermal conduction composition, an experimental series is reproduced only, by way of example, for thermal conduction compositions with aluminum oxide particles as thermally conducting auxiliary, these compositions differing only in respect of the specific structure and morphology of the aluminum oxide particles. It is noted that similar results have been obtained when using other auxiliary systems as well, and also with other polymers.

TABLE 1

| Sample # | α content [% by weight] | BET [m²/g] | Primary particle size [µm] | Particle size D50 [µm] | Thermal conductivity [W/mK] |
|---|---|---|---|---|---|
| Inventive examples: | | | | | |
| 1 | 98 | 0.8 | 2 | 70 | 1.2 |
| 2 | 98 | 1 | 2 | 4.16 | 0.99 |
| 3 | 98 | 1 | 3 | 5.43 | 0.95 |
| Comparative examples: | | | | | |
| 4 | 98 | 2 | — | 13.81 | 0.81 |
| 5 | 98 | 1.5 | 2 | 2.68 | 0.69 |
| 6 | 96 | 5 | 1.5 | 1.6 | 0.7 |
| 7 | 98 | 8 | 0.7 | 0.7 | 0.74 |
| 8 | 98 | 4.1 | 1.6 | 1.7 | 0.74 |
| 9 | 95 | 9 | 0.5 | 3 | — |
| 10 | >70 | 10 | 1 | 3 | — |
| 11 | <2 | 150 | 1 | 6 | — |

In this table, in addition to the sample number for identifying the samples (samples 1-3 as inventive examples and samples 4-11 as comparative examples), the volume-based amount of alpha-aluminum oxide in the auxiliary (α content), the mass-based specific surface area of the auxiliary (BET), the average primary particle size and the average particle size of the auxiliary (the latter as the D50 value), and also the thermal conductivity of the resultant thermal conduction compositions are listed.

Figure 1:
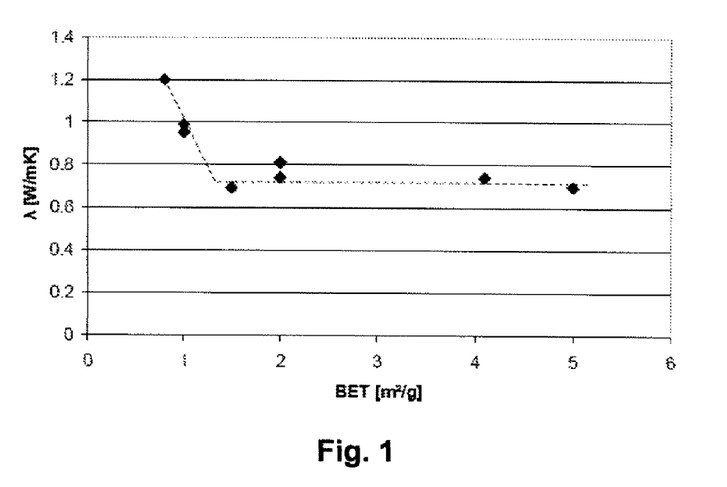
FIG. 1 shows a diagram in which the thermal conductivity of thermal conduction compositions is shown as a function of the specific surface area of the aluminum oxide particles employed therein as thermally conducting auxiliary.

FIG. 1 shows results from Table 1 for the correlation of the thermal conductivity λ of the thermal conduction composition and the mass-weighted specific surface area (BET) of the auxiliary. The line in FIG. 1 serves in this case merely as a visual orientation aid.

From FIG. 1 it is apparent that the thermal conductivity λ of the thermal conduction composition is approximately constant (around 0.56 W/mK) for specific surface areas of more than 1.5 m²/g and is therefore independent of the size of the specific surface area. In the case of specific surface areas of less than 1.3 m²/g (samples 1-3), however, the thermal conductivity increases in line with the decrease in specific surface area, to a level of 1 W/mK or even more.

Figure 2:
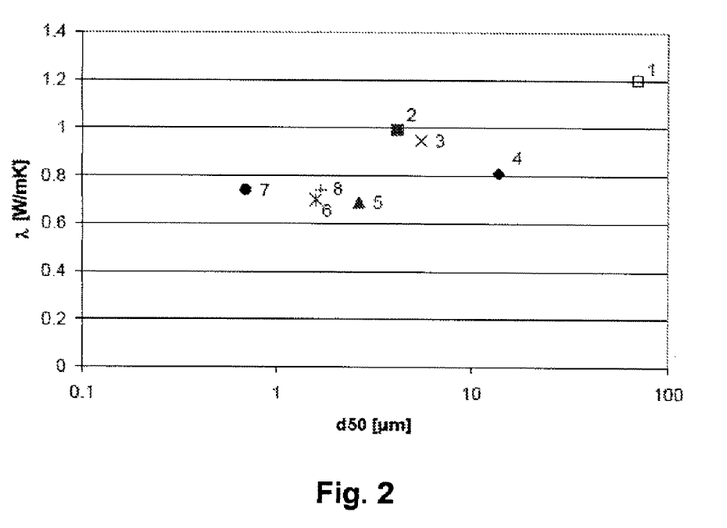
FIG. 2 shows a diagram in which, for the samples depicted in FIG. 1, the thermal conductivity of the thermal conduction composition is plotted as a function of the average particle size of the aluminum oxide particles.

FIG. 2 shows the results from Table 1 for the correlation of the thermal conductivity λ of the thermal conduction composition and the average particle diameter (D50) of the auxiliary. From FIG. 2 it is apparent that the samples with the smallest specific surface area (samples 1, 2 and 3) do have significantly higher thermal conductivities, owing to surface area, than samples with a larger specific surface area (samples 4 and 5, for instance), but that the thermal conductivity is not correlated systematically with the average particle diameter.

It is true that the specific surface area is also dependent to a certain degree on the particle size (a larger particle diameter tends to result in a smaller mass-based specific surface area). Nevertheless, this trend is not reflected in the results obtained for samples 1-4, since samples 2 and 3 possess a considerably greater thermal conductivity than sample 4, despite the fact that the particle diameter in sample 4 was considerably larger. Accordingly, the increase in thermal conductivity is in fact an effect of the specific surface area and not an effect of the particle size. This has been confirmed in further series of experiments for other samples as well.

Furthermore, it is apparent from Table 1 that, using acrylate-based polymers as thermal conduction composition, it was possible to obtain systems that can be employed in practice only when the amount of alpha-aluminum oxide was very high. Hence the thermal conduction compositions of samples 1-8, in which the amount of alpha-aluminum oxide in the auxiliary was greater than 95%, lend themselves readily to blending in the compounder and, subsequently, to pressing to give an adhesive film. For samples 9, 10, and 11, in contrast, in which there was also gamma- and/or beta-aluminum oxide present, severe crosslinking of the thermal conduction composition occurred while still in the compounder, and so the samples can no longer be shaped under the press in the form of thermally conducting sheetlike elements, and hence could also not be used for measurements of the thermal conductivity on these systems. This demonstrates the practical advantages of auxiliaries comprising aluminum oxide present to an extent of more than 95% by weight as the alpha crystal structure, particularly in the case of acrylate-based thermal conduction compositions.

Determining the bond strength to different bonding substrates was carried out for a noncrosslinked thermal conduction composition after a bonding duration of 14 days, namely for sample 2. On a polar steel substrate, the bond strength determined in this way was 18.1 N/cm; on a polyamide substrate it was 8.5 N/cm, and on an apolar polyethylene substrate it was still 0.75 N/cm. The bond strength measurement results demonstrate that the thermal conduction composition selected as an example exhibits sufficiently good pressure-sensitive adhesive performance and is therefore suitable for producing a pressure-sensitively adhesive, thermally conducting sheetlike element.

The test of the electrical breakdown resistance in accordance with VDE 0100 was likewise passed by all of the inventive samples. From this it is evident that the thermal conduction compositions of the invention are not electrically conducting and can therefore be used even where electrical insulation of thermally conductingly connected components is required, such as in electronic devices, for instance.

The experiments therefore demonstrate the outstanding suitability of the thermal conduction compositions of the invention and also of the thermally conducting sheetlike elements produced using them, as heat transfer systems.

The invention claimed is:
1. A thermal conduction composition comprising at least one (meth)acrylic acid-based polymer and a thermally conducting auxiliary, wherein
the thermally conducting auxiliary comprises particles that (A) have a mass-based specific surface area of 1.3 m²/g or less and (B) are composed of primary particles;

the thermal conduction composition is formulated as an adhesive; and the thermal conduction composition exhibits a thermal conductivity that is higher than that of a composition otherwise identical to the thermal conduction composition except for having a thermal conducting auxiliary comprising particles that (A) have a mass-based specific surface area greater than 1.3 m²/g and (B) are composed of primary particles.

2. The thermal conduction composition of claim 1, wherein the primary particles have an average diameter of at least 1 µm.

3. The thermal conduction composition of claim 1, wherein the particles of the thermally conducting auxiliary that have a mass-based specific surface area of 1.3 m²/g or less have a mass-based specific surface area of 1.0 m²/g or less.

4. The thermal conduction composition of claim 1, wherein the particles of the thermally conducting auxiliary that have a mass-based specific surface area of 1.3 m²/g or less comprise at least substantially aluminum oxide particles, boron nitride particles or a mixture of aluminum oxide and boron nitride particles.

5. The thermal conduction composition of claim 4, wherein the aluminum oxide particles are composed in a fraction of more than 95% by weight of alpha-aluminum oxide.

6. The thermal conduction composition of claim 1, wherein the thermally conducting auxiliary is composed of material having a thermal conductivity of more than 1 W/mK.

7. The thermal conduction composition of claim 1, wherein the thermally conducting auxiliary is present in the thermal conduction composition in a fraction of at least 5% and not more than 70% by volume, based in each case on the volume of the thermally conducting auxiliary in the thermal conduction composition.

8. The thermal conduction composition of claim 1, wherein the particles that have a mass-based specific surface area of 1.3 m²/g or less have an average diameter in a range from 2 µm to 500 µm.

9. The thermal conduction composition of claim 1, wherein said at least one polymer is a polymer based on at least one of acrylic esters, methacrylic esters and derivatives thereof.

10. The thermal conduction composition of claim 1, which further comprises a further auxiliary with a phase change material.

11. A method for producing a thermally conducting sheetlike element comprising incorporating a thermal conduction composition of claim 1 into said thermally conducting sheetlike element.

12. A method for heat transport within an electronics device comprising incorporating a thermal conduction composition of claim 1 into said electronics device.

13. The thermal conduction composition of claim 1, wherein the particles of the thermally conducting auxiliary that have a mass-based specific surface area of 1.3 m²/g or less comprise aluminum oxide particles.

* * * * *